United States Patent
Miklosovic et al.

(10) Patent No.: US 10,291,166 B2
(45) Date of Patent: May 14, 2019

(54) SYSTEM AND METHOD OF SINGLE PARAMETER RATIOMETRIC TUNING FOR MOTOR DRIVES

(71) Applicant: Rockwell Automation Technologies, Inc., Mayfield Heights, OH (US)

(72) Inventors: Robert J. Miklosovic, Chardon, OH (US); Mark Chaffee, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/457,189

(22) Filed: Mar. 13, 2017

(65) Prior Publication Data
US 2018/0262143 A1 Sep. 13, 2018

(51) Int. Cl.
H02P 23/00 (2016.01)
H02P 23/20 (2016.01)
H02P 23/04 (2006.01)
H02P 23/14 (2006.01)

(52) U.S. Cl.
CPC .......... *H02P 23/0031* (2013.01); *H02P 23/00* (2013.01); *H02P 23/0077* (2013.01); *H02P 23/04* (2013.01); *H02P 23/14* (2013.01); *H02P 23/20* (2016.02)

(58) Field of Classification Search
CPC .......... E05Y 2900/531; E05Y 2800/113; E05F 15/0021; E05F 15/20; G01L 1/16
USPC ........................................ 318/456
See application file for complete search history.

(56) References Cited

U.S. PATENT DOCUMENTS

| | | | |
|---|---|---|---|
| 2003/0040817 A1* | 2/2003 | Krah | G05B 13/024 700/55 |
| 2014/0198039 A1* | 7/2014 | Yayama | H02P 29/00 345/156 |
| 2016/0018466 A1 | 1/2016 | Miklosovic | |

FOREIGN PATENT DOCUMENTS

| | | |
|---|---|---|
| EP | 2048773 A2 | 4/2009 |
| EP | 2846207 A1 | 3/2015 |

OTHER PUBLICATIONS

Extended European Search Report dated Aug. 6, 2018; European Application No. 18159617.2—(6) pages.

* cited by examiner

*Primary Examiner* — Kawing Chan
*Assistant Examiner* — Bradley R Brown
(74) *Attorney, Agent, or Firm* — Boyle Fredrickson, SC (57) ABSTRACT

An improved system and method for tuning a motor controller is disclosed. The improved system and method for tuning a motor controller adjusts controller gains and filter settings in tandem to achieve a desired level of performance. A user terminal is in communication with a motor controller and reads the existing controller gains from the motor controller. The user terminal displays the existing controller gains and at least one user selectable object for adjusting the controller gains. A user adjusts the user selectable object to adjust the controller gains in tandem. The controller gains are adjusted responsive to the user input while maintaining existing relationships between controller gains. The user terminal writes the adjusted values of the gains to the motor controller.

20 Claims, 6 Drawing Sheets

SYSTEM AND METHOD OF SINGLE PARAMETER RATIOMETRIC TUNING FOR MOTOR DRIVES

BACKGROUND OF THE INVENTION

The subject matter disclosed herein relates generally to a system and method for tuning a motor drive and, more specifically, to a system and method for tuning a motor drive by adjusting a group of tuning parameters in tandem and maintaining an existing mathematical relationship between the parameters.

As is known to those skilled in the art, motor drives are utilized to control operation of a motor. According to one common configuration, a motor drive includes a DC bus having a DC voltage of suitable magnitude from which an AC voltage may be generated and provided to the motor. The DC voltage may be provided as an input to the motor drive or, alternately, the motor drive may include a rectifier section which converts an AC voltage input to the DC voltage present on the DC bus. The motor drive includes power electronic switching devices, such as insulated gate bipolar transistors (IGBTs), thyristors, or silicon controlled rectifiers (SCRs). The power electronic switching device further includes a reverse conduction power electronic device, such as a free-wheeling diode, connected in parallel across the power electronic switching device. The reverse conduction power electronic device is configured to conduct during time intervals in which the power electronic switching device is not conducting. A controller in the motor drive generates switching signals to selectively turn on or off each switching device to generate a desired DC voltage on the DC bus or a desired motor voltage.

The motor drive receives a command signal which indicates the desired operation of the motor. The command signal may be a desired position, speed, or torque at which the motor is to operate. The position, speed, and torque of the motor are controlled by varying the amplitude and frequency of the AC voltage applied to the stator. The motor is connected to the output terminals of the motor drive, and the controller generates the switching signals to rapidly switch the switching devices on and off at a predetermined switching frequency and, thereby, to alternately connect or disconnect the DC bus to the output terminals and, in turn, to the motor. By varying the duration during each switching period for which the output terminal of the motor drive is connected to the DC voltage, the magnitude of the output voltage is varied. The motor controller utilizes modulation techniques such as pulse width modulation (PWM) to control the switching and to synthesize waveforms having desired amplitudes and frequencies.

In order to convert the command signal to the desired output voltage, the motor drive includes a control section. The control section may vary in complexity according to the performance requirements of the motor drive. For instance, a motor drive controlling operation of a pump may only need to start and stop the pump responsive to an on/off command. The motor drive may require minimal control such as an acceleration and deceleration time for the pump. In contrast, another motor drive may control a servo motor moving, for example, one axis of a machining center or an industrial robotic arm. The motor drive may need to not only start and stop the motor, but operate at various operating speeds and/or torques or follow a position command. The motor control may include multiple control circuits, such as a position, velocity, torque, or current control circuit, or a combination thereof. Each control circuit may include, for example, a proportional (P), integral (I), or derivative (D) control path with associated controller gains in each path and may further require additional feedback and/or feed forward control gains. In order to achieve the desired operating performance of the motor, it is necessary to properly select the control paths and the control gains associated with each path.

However, selecting the control gains to achieve a desired level of performance has certain challenges. Although the control paths may be either in parallel or in series with each other, there is ultimately a single input and a single output for the control system. Adjusting a control gain along one path impacts the performance of one or more other paths. The interaction of control gains along various paths often requires a time and labor-intensive iterative approach to selecting control gains in order to achieve the desired level of performance. Manual tuning of the parameters takes time and requires a technician with a high level of skill. Further, different technicians may employee different techniques and tuning the motor drive often becomes more of an educated guess than a repeatable process.

In order to achieve better performance from a control system, some controllers provide an automatic tuning procedure. However, existing automatic tuning procedures have certain drawbacks as well. The controller typically only knows the characteristics of a portion of the controlled system. For example, the controlled system may include hardware contained within the motor controller, a motor, a physical coupling to a controlled load, and a controlled load. The controller may know the characteristics of the hardware within the motor controller and of the motor, but may be required to make assumptions regarding the rest of the controlled system. For example, the auto tuning procedure may expect "rigid" coupling of the controlled load to the motor or a low inertia ratio. Such characteristics of the controlled system more closely represent an ideal system and reduce the complexity of determining controller gains. However, it is common for controlled systems to have couplings that are more "compliant" than "rigid." With a compliant coupling or high load inertia ratios, various mechanical resonant frequencies may exist. When a resonant frequency exists, automatic tuning procedures typically either fail to identify a stable set of controller gains or they identify controller gains that result in a slow response from the controlled load in order to avoid exciting the resonant operating point. This poor tuning results in a system being controlled at less than its desired performance level, reducing the overall performance of the system. Attempting to achieve the desired performance level after the auto-tuning process is complete reverts to manual tuning, is complex, and again requires the skilled technician.

Thus, it would be desirable to provide an improved system for tuning of a motor controller to achieve a desired level of performance.

BRIEF DESCRIPTION OF THE INVENTION

The subject matter disclosed herein describes an improved method for tuning a motor controller to select controller gains and filter settings to achieve a desired level of performance. A user terminal is in communication with a motor controller and reads the existing controller gains from the motor controller. The user terminal displays the existing controller gains and at least one user selectable object for adjusting the controller gains. A user adjusts the user selectable object to adjust the controller gains in tandem. The controller gains are adjusted in response to the user input while maintaining existing relationships between controller gains. The user terminal writes the adjusted values of the gains to the motor controller.

According to one embodiment of the invention, a method for tuning performance of a motor drive is disclosed. The motor drive controls operation of a motor operatively connected to the motor drive. Values of multiple parameters are read into a user terminal from a memory device in the motor drive. The value in each of the parameters defines either a controller gain or a filter setting. Multiple ratios are determined, where each ratio is determined between the value stored in a first parameter and the value stored in one of the other parameters. Each of the first and second parameters are selected from the multiple parameters. The values of at least a portion of the parameters and at least one user selectable object are displayed on a monitor of the user terminal. Each user selectable object is operative to change the values of the parameters. The values of the parameters are adjusted via one of the user selectable objects, and the ratios remain the same when the values of the parameters are adjusted. The adjusted values of the parameters are written from the user terminal to the memory device on the motor drive.

According to another embodiment of the invention, a method for tuning performance of a motor drive is disclosed. The motor drive is controlling operation of a motor operatively connected to the motor drive. Values of multiple parameters are displayed on a user interface, and the value of each of the parameters defines either a controller gain or a filter setting for the motor drive. Multiple ratios are defined between the values of the parameters. An input is received from at least one user selectable object corresponding to an adjustment to the values of the parameters, and the values of the parameters are adjusted in response to the input. The ratios remain the same when the values of the parameters are adjusted. The adjusted values of the parameters are displayed on the user interface and stored in a memory device in the motor drive.

According to still another embodiment of the invention, a system for determining configuration of a controller in a motor drive is disclosed, where the controller includes multiple controller gains. The system includes a monitor, a user-interface, a non-transitory storage medium, and a processor. The monitor displays at least one user selectable object, and the user interface is operative to change the user selectable object. The non-transitory storage medium is configured to store multiple instructions, and the processor is in communication with the non-transitory storage medium. The processor is operative to execute the stored instructions to read a value from each of the controller gains in the motor drive and to determine multiple ratios, where each ratio is between the value stored in a first controller gain and the value stored in one of the other controller gains. The user selectable object is displayed on the monitor, and an input is received from the user interface corresponding to a desired change in the values of the controller gains. Each user selectable object is operative to change the values of the controller gains, and the values of the controller gains are adjusted via one of the user selectable objects. The plurality of ratios remains the same when the values of the controller gains are adjusted, and the adjusted values of the controller gains are written to the motor drive.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
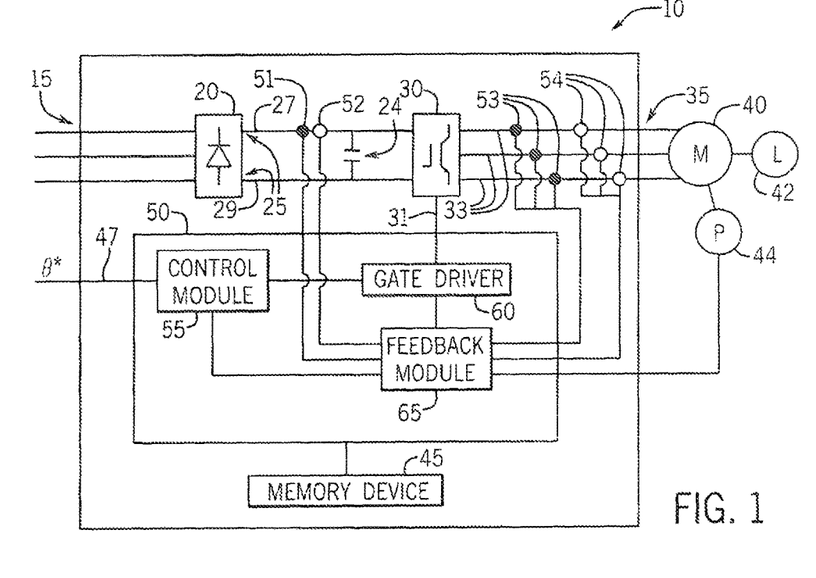
FIG. 1 is a block diagram of a motor drive incorporating one embodiment of the present invention.
Figure 2:
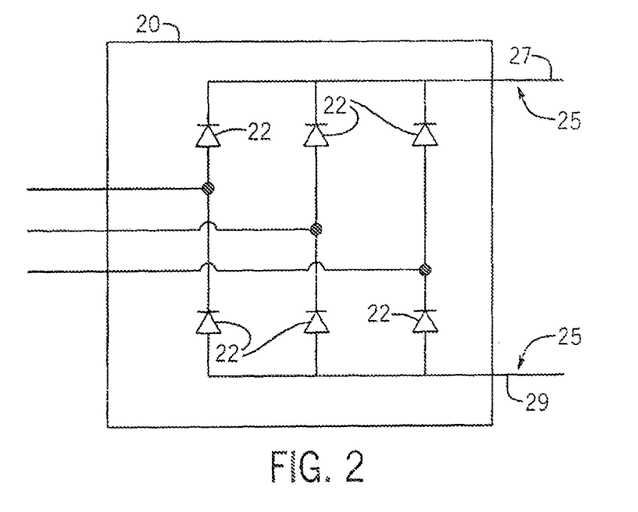
FIG. 2 is a block diagram representation of a rectifier section from the motor drive of FIG. 1.

Turning initially to FIG. 1, a motor drive 10, which may be used in conjunction with the various embodiments of the invention disclosed herein, is configured to receive a three-phase AC voltage at an input 15 of the motor drive 10 which is, in turn, provided to a rectifier section 20 of the motor drive 10. The rectifier section 20 may include any electronic device suitable for passive or active rectification as is understood in the art. With reference also to FIG. 2, the illustrated rectifier section 20 includes a set of diodes 22 forming a diode bridge that rectifies the three-phase AC voltage to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the DC voltage between the negative and positive rails, 29 and 27, is generally equal to the magnitude of the peak of the AC input voltage.

Figure 3:
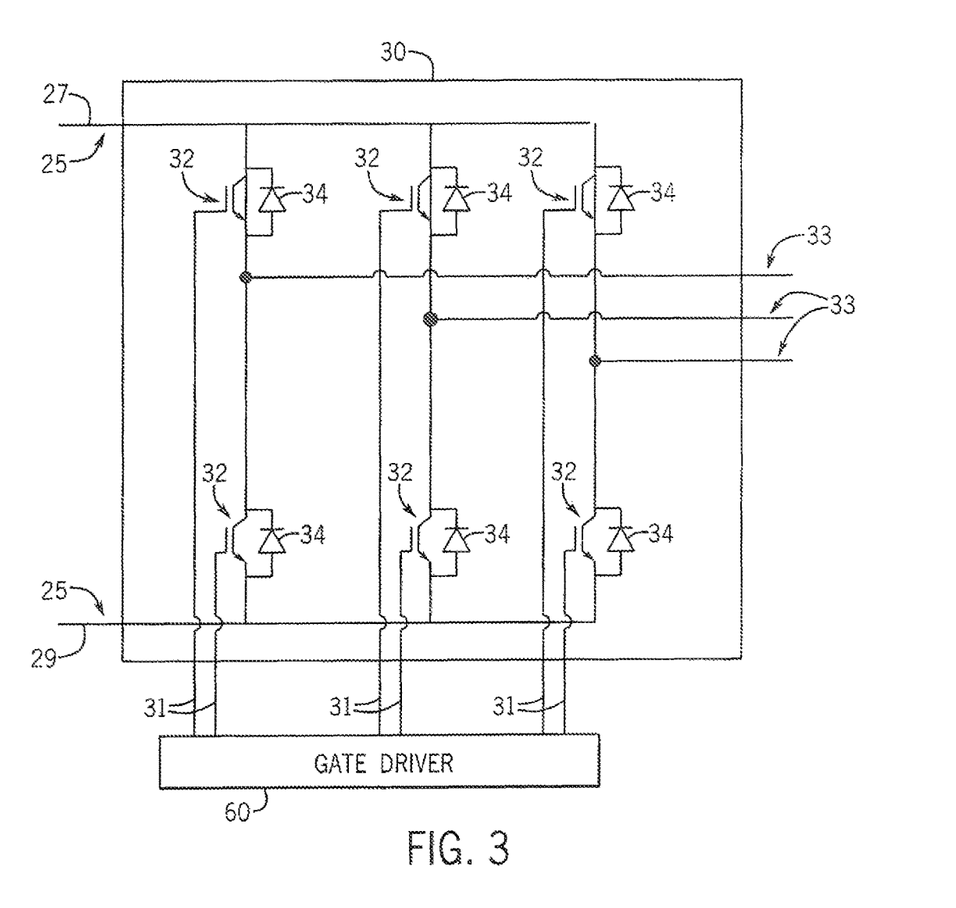
FIG. 3 is a block diagram representation of an inverter section and gate driver module from the motor drive of FIG. 1.

The DC bus 25 is connected in series between the rectifier section 20 and an inverter section 30. Referring also to FIG. 3, the inverter section 30 consists of switching elements, such as transistors, thyristors, or SCRs as is known in the art. The illustrated inverter section 30 includes an insulated gate bipolar transistor (IGBT) 32 and a free-wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 may be connected to the motor 40 via a cable including electrical conductors connected to each of the output terminals 35.

One or more modules are used to control operation of the motor drive 10. According to the embodiment illustrated in FIG. 1, a controller 50 includes the modules and manages execution of the modules. The illustrated embodiment is not intended to be limiting and it is understood that various features of each module discussed below may be executed by another module and/or various combinations of other modules may be included in the controller 50 without deviating from the scope of the invention. The modules may be stored programs executed on one or more processors, logic circuits, or a combination thereof. The controller 50 may be implemented, for example, in a microprocessor, application specific integrated circuit (ASIC), field programmable gate array (FPGA), or other such customizable device. The motor drive 10 also includes a memory device 45 in communication with the controller 50. The memory device 45 may include transitory memory, non-transitory memory or a combination thereof. The memory device 45 may be configured to store data and programs, which include a series of instructions executable by the controller 50. It is contemplated that the memory device 45 may be a single device, multiple devices, or incorporated, for example, as a portion of another device such as an application specific integrated circuit (ASIC). The controller 50 is in communication with the memory 45 to read the instructions and data as required to control operation of the motor drive 10.

According to one embodiment of the invention, the controller 50 receives a reference signal 47 identifying desired operation of the motor 40 connected to the motor drive 10. The reference signal 47 may be, for example, a position reference ($\theta^*$), a speed reference ($\omega^*$), or a torque reference ($T^*$). For a high performance servo control system, the reference signal 47 is commonly a position reference signal ($\theta^*$).

The controller 50 also receives feedback signals indicating the current operation of the motor drive 10. According to the illustrated embodiment, the controller 50 includes a feedback module 65 that may include, but is not limited to, analog to digital (A/D) converters, buffers, amplifiers, and any other components that would be necessary to convert a feedback signal in a first format to a signal in a second format suitable for use by the controller 50 as would be understood in the art The motor drive 10 may include a voltage sensor 51 and/or a current sensor 52 on the DC bus 25 generating a feedback signal corresponding to the magnitude of voltage and/or current present on the DC bus 25. The motor drive 10 may also include one or more voltage sensors 53 and/or current sensors 54 on the output phase(s) of the inverter section 30 generating a feedback signal corresponding to the magnitude of voltage and/or current present on the electrical conductors 33 between the inverter section 30 and the output 35 of the motor drive.

The controller 50 utilizes the feedback signals and the reference signal 47 to control operation of the inverter section 30 to generate an output voltage having a desired magnitude and frequency for the motor 40. The feedback signals are processed by the feedback module 65 and converted, as necessary, to signals for the control module 55. The control module 55 also receives the reference signal 47 and executes responsive to the reference signal 47 and the feedback signals to generate a desired output voltage signal to a gate driver module 60. The gate driver module 60 generates the gating signals 31, for example, by pulse width modulation (PWM) or by other modulation techniques. The gating signals 31 subsequently enable/disable the transistors 32 to provide the desired output voltage to the motor 40, which, in turn, results in the desired operation of the mechanical load 42 coupled to the motor 40.

Figure 4:
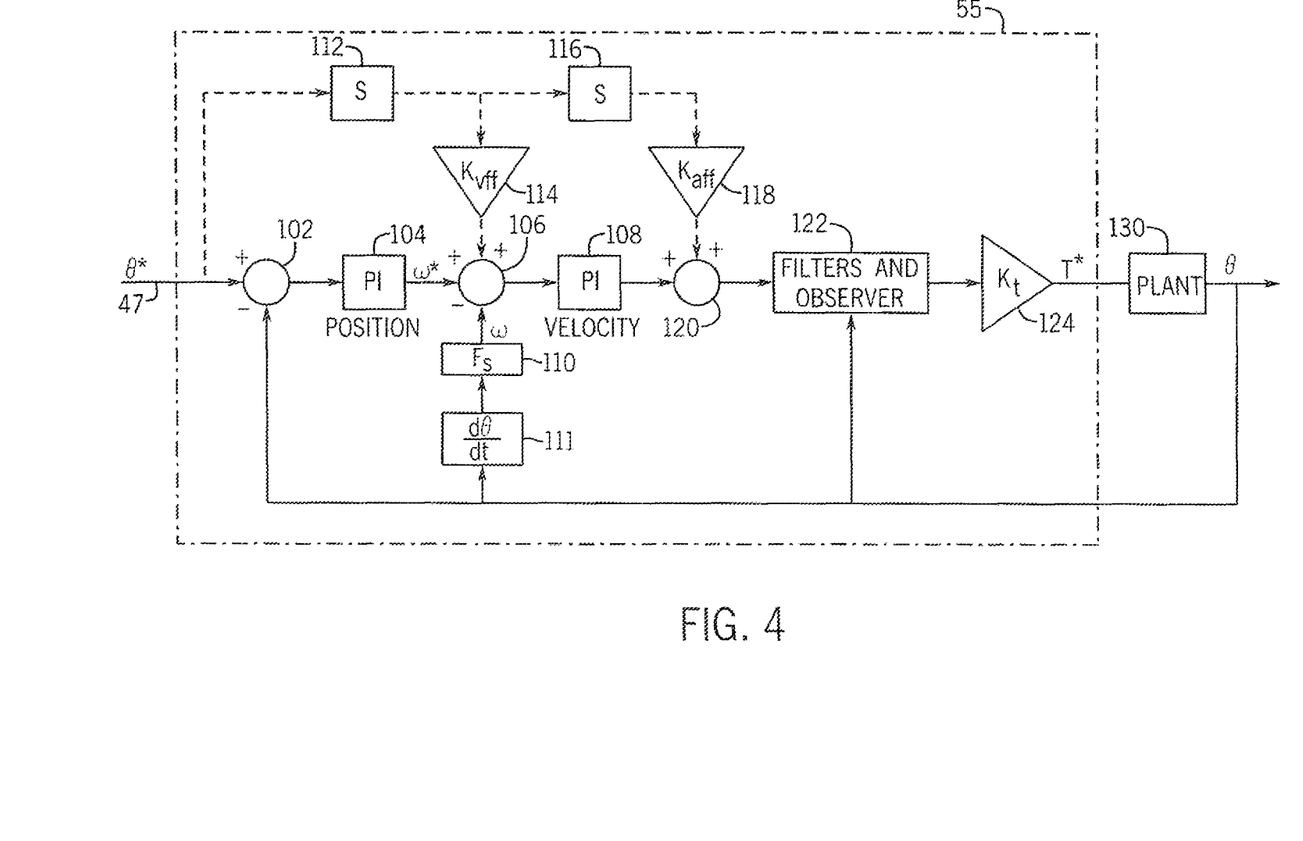
FIG. 4 is a block diagram representation of one embodiment of a control module from the motor drive of FIG. 1.

Referring next to FIG. 4, a control module 55 for the motor drive 10, which may be tuned by the system and method of the various embodiments of the invention disclosed herein, is illustrated. The control module 55 receives a position reference signal ($\theta^*$) 47 as an input. The position reference signal ($\theta^*$) 47 is compared to a position feedback signal ($\theta$) at a first summing junction 102. A position error signal is output from the first summing junction 102 and input to a position loop controller 104. According to the illustrated embodiment, the position loop controller 104 is a proportional-integral (PI) controller. Optionally, the position loop controller 104 may be just a proportional (P) controller or further include a derivative (D) component. Each of the proportional (P), integral (I), and/or derivative (D) components of the position loop controller 104 includes a controller gain. The position loop controller gains are commonly referred to as a position loop proportional gain (Kpp), position loop integral gain (Kpi), and a position loop derivative gain (Kpd). The output of the position loop controller 104 is a velocity reference signal ($\omega^*$).

The velocity reference signal ($\omega^*$) is compared to a velocity feedback signal ($\omega$) at a second summing junction 106. The velocity feedback signal ($\omega$) is generated by taking a derivative, as shown in the derivative block 111, of the position feedback signal ($\theta$). The velocity feedback signal ($\omega$) may also be filtered by a velocity filter as illustrated by block 110 and the velocity feedback filter tuning parameter, Fs. A velocity error signal is output from the second summing junction 106 and input to a velocity loop controller 108. According to the illustrated embodiment, the velocity loop controller 108 is a proportional-integral (PI) controller. Optionally, the velocity loop controller 108 may be just a proportional (P) controller or further include a derivative (D) component. Each of the proportional (P), integral (I), and/or derivative (D) components of the velocity loop controller 108 includes a controller gain. The velocity loop controller gains are commonly referred to as a velocity loop proportional gain (Kvp), velocity loop integral gain (Kvi), and a velocity loop derivative gain (Kvd). The output of the velocity loop controller 108 is an acceleration reference signal.

The control module 55 may also include feed forward branches. According to the illustrated embodiment, the control module 55 includes feed forward branches for both the velocity and the acceleration elements. The position reference signal ($\theta^*$) is passed through a first derivative element 112 to obtain a velocity feed forward signal. The velocity feed forward signal is multiplied by a velocity feed forward gain (Kvff) 114 and combined with the velocity reference signal ($\omega^*$) and the velocity feedback signal ($\omega$) at the second summing junction 106. The velocity feed forward signal is passed through a second derivative element 116 to obtain an acceleration feed forward signal. The acceleration feed forward signal is multiplied by an acceleration feed forward gain (Kaff) 118 and combined with the acceleration reference signal at a third summing junction 120.

The output of the third summing junction 120 is further processed prior to generating gate signals 31 for the inverter section 30. The output of the third summing junction 120 is provided as an input to a filter and observer section 122. The filter and observer section 122 may include one or more filters to remove unwanted components from the control system or an observer to generate an estimated feedback value for use in the control system. The filter and observer section 122 may include, for example, a low pass filter to attenuate undesirable high frequency components, one or more notch filters to attenuate specific frequency components having an undesirable effect on the controlled mechanical load, or a torque observer to generate an estimated value of the torque being generated by the motor. The filters may include a bandwidth tuning parameter, such as Klp for a low pass filter, and/or a frequency set point, such as the desired frequency to attenuate with a notch filter. It is further contemplated that additional filters may be included in the filter and observer section 122 without deviating from the scope of the invention. An observer in the filter and observer section 122 may be tunable in a similar manner to the control loops discussed above. The observer may include a proportional (P) branch, an integral (I) branch, and/or a derivative (D) branch. Each branch of the observer includes a proportional (P), integral (I), and/or derivative (D) gain. The observer gains are commonly referred to as an observer proportional gain (Kop), an observer integral gain (Koi), and an observer derivative gain (Kod). The output of the observer is an estimated load torque signal.

The output of the filter and observer section 122 is passed through a torque gain block 124. The torque gain block 124 includes a torque constant (Kt) which defines a relationship between the current provided to the motor 40 and the torque output by the motor. The torque gain block 124 may include one or more additional gain elements, such as a gain element that compensates for motor and/or load inertia, combined with the torque constant (Kt) to produce a desired torque reference (T*) to the plant 130 of the controlled system. In a motion control system, the plant 130 typically includes the inverter section 30 of the motor drive 10, the motor 40, a mechanical load 42, a position feedback device 44, and mechanical couplings between the motor 40 and mechanical load 42 or between the motor 40 and a position feedback device 44. The position feedback device 44 generates the position feedback signal ($\theta$) used by the control module 55.

The torque reference signal output from the control module 55 is provided as an input to the plant 130. With reference again to FIG. 1, the output of the control module 55 is provided as an input to the gate driver module 60. The gate driver module 60 converts the torque reference to a desired output voltage having a variable amplitude and frequency, where the amplitude and frequency are selected to produce the torque reference supplied to the gate driver module 60. Having determined the output voltage required to produce the desired torque, the desired output voltage is used to generate the gating signals 31 used by pulse width modulation (PWM) or by other modulation techniques to control the switching elements in the inverter section 30 to produce the desired output voltage. The gating signals 31 subsequently enable/disable the transistors 32 to provide the desired output voltage to the motor 40, which, in turn, results in the desired operation of the mechanical load 42 coupled to the motor 40.

As discussed above, the control module 55 may include a number of controller gains and filter settings which affect performance of the motor drive 10. The controller gains and filter settings need to be adjusted or tuned in order to achieve a desired performance level. Settings for each of the controller gains and filter settings are stored in a non-volatile portion of the memory device 45 to retain the settings when power is removed from the motor drive 10. Typically, the settings are transferred to a volatile portion of the memory device 45 upon applying power to the motor drive 10 to provide for quick reads of the values for use in execution of the control module 55. Default values for each of the controller gains and filter settings may be stored in the memory device 45 from the factory, where the default settings are typically configured to provide a conservative response of the control module 55, such that the a broad range of applications may be started up with little chance of exciting resonances in the mechanical system or having other undesirable and/or unstable operation of the controlled load.

Figure 5:
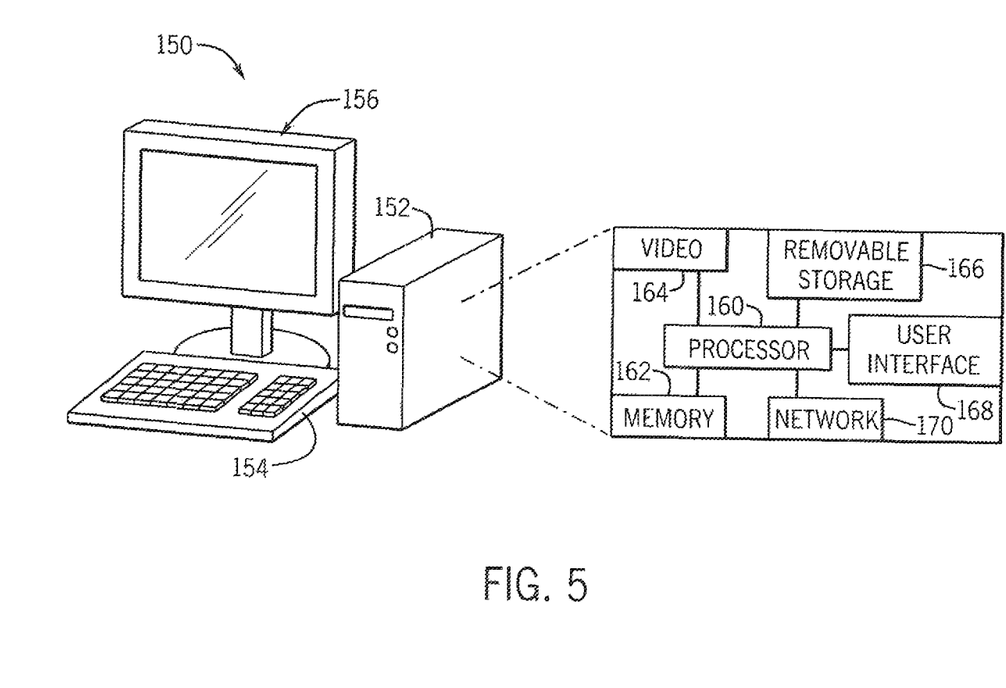
FIG. 5 is a block diagram representation of an exemplary user terminal in communication with the motor drive of FIG. 1.

In operation, a user terminal 150 is provided to facilitate tuning the controller gains and filter settings of the motor drive 10. With reference to FIG. 5, an exemplary user terminal 150 may be a desktop computing unit with a processing unit 152, a user interface, such as a keyboard 154, and a monitor 156. In other embodiments, the user terminal 150 may be a portable computing device such as a notebook computer, a tablet computer, a laptop computer, a smart phone, or a dedicated industrial computing device such as a human-machine interface (HMI), industrial computer, and the like. The user terminal 150 may include various user interfaces, such as a mouse, trackball, touchpad, writing tablet, touch screen and the like. The user terminal 150 includes a processor 160 operative to execute instructions stored in memory 162. The processor 160 is in communication with a video driver 164 or video card to display information on the monitor 156, a user interface port 168 to receive data from the keyboard 154 or other user interface device, and removable storage interface 166, where the removable storage medium may include, but is not limited to a disk, CD-ROM, DVD-ROM, memory card, USB storage device, and the like. The user terminal 150 also includes a network interface 170 by which it may communicate with the motor drive 10, other user terminals 150, the Internet, and the like.

A tuning application stored in non-transitory memory is executable on the user terminal 150. The tuning application may be stored in the memory device 162 or on a removable storage medium and accessed via the removable storage interface 166. The tuning application includes an interface screen 200 through which an operator may adjust the controller gains or filter settings of the motor drive 10.

The tuning application first obtains a set of controller gains and filter settings from a motor drive 10. According to one embodiment of the invention, the tuning application communicates via the network interface 170 to the motor drive 10 and requests the motor drive 10 transmit each of the controller gains and filter settings to the user terminal 150. According to another embodiment of the invention, a user may manually enter gain values into text fields on the interface screen 200, where the gain values may have been previously recorded from a motor drive 10 not connected to the user terminal 150. According to still another embodiment, a set of controller gains and filter settings may be stored on a removable storage medium, such as a USB storage device or memory card and inserted into the user terminal 150. The tuning application may retrieve the values for the controller gains and filter settings stored on the removable storage medium via the removable storage interface 166. According to yet another embodiment, the tuning application may include a table of default settings for multiple motor drives 10 to which it is to be connected. The tuning application may detect or the user may enter the type of motor drive 10 to which the tuning application is connected, and the tuning application may retrieve an initial set of default settings for the controller gains and filter settings.

Having obtained a set of controller gains and filter settings from the motor drive 10, the processor 160 determines relationships between each of the controller gains and/or filter settings. According to one embodiment of the invention, the relationships identified are ratios between one of the controller gains or filter settings and another controller gain or filter setting. In a PI controller, it is common that the relationship between the proportional gain and the integral gain includes a squared relationship. For example, the proportional gain may be determined in units of radians per seconds while the integral gain may be determined in radians per seconds squared. It is contemplated that the ratios may be determined based on the differing unit relationships between controller gains and that the relationship between the controller gains, such as the squared relationship, be maintained as the controller gains are adjusted. Optionally, the controller gains may each be converted to a common unit prior to determining the relationships between the gains. For example, the integral gain described above may first be converted to radians per second or both the proportional and integral gains may be converted to a common unit, such as Hertz, before determining a relationship between the gains. With a common unit, the ratio between gains is a direct relationship between the two gains.

Figure 6:
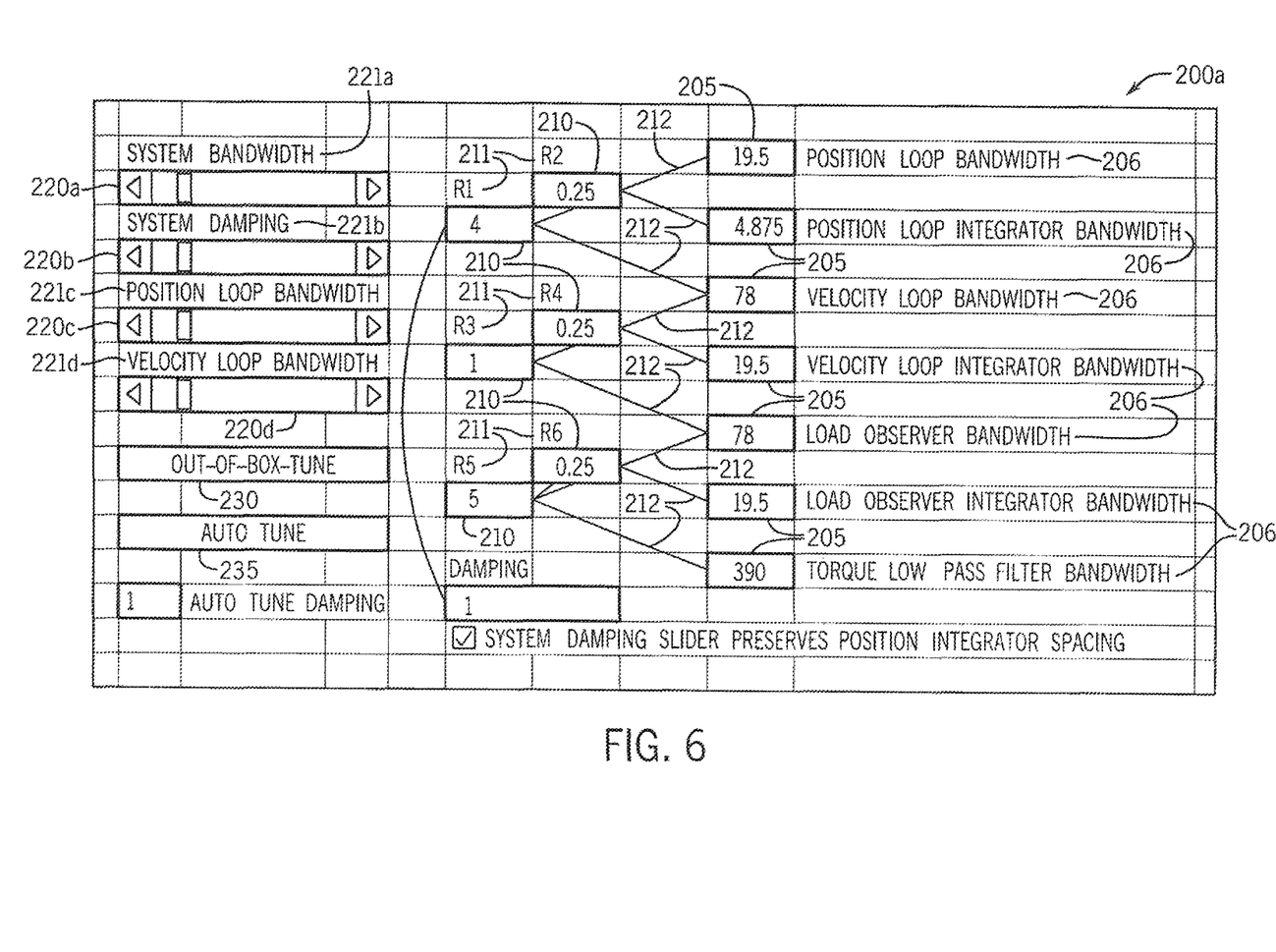
FIG. 6 is one embodiment of an interface screen displayed on a monitor of the user terminal of FIG. 5 for adjusting parameters of the motor drive of FIG. 1.
Figure 7:
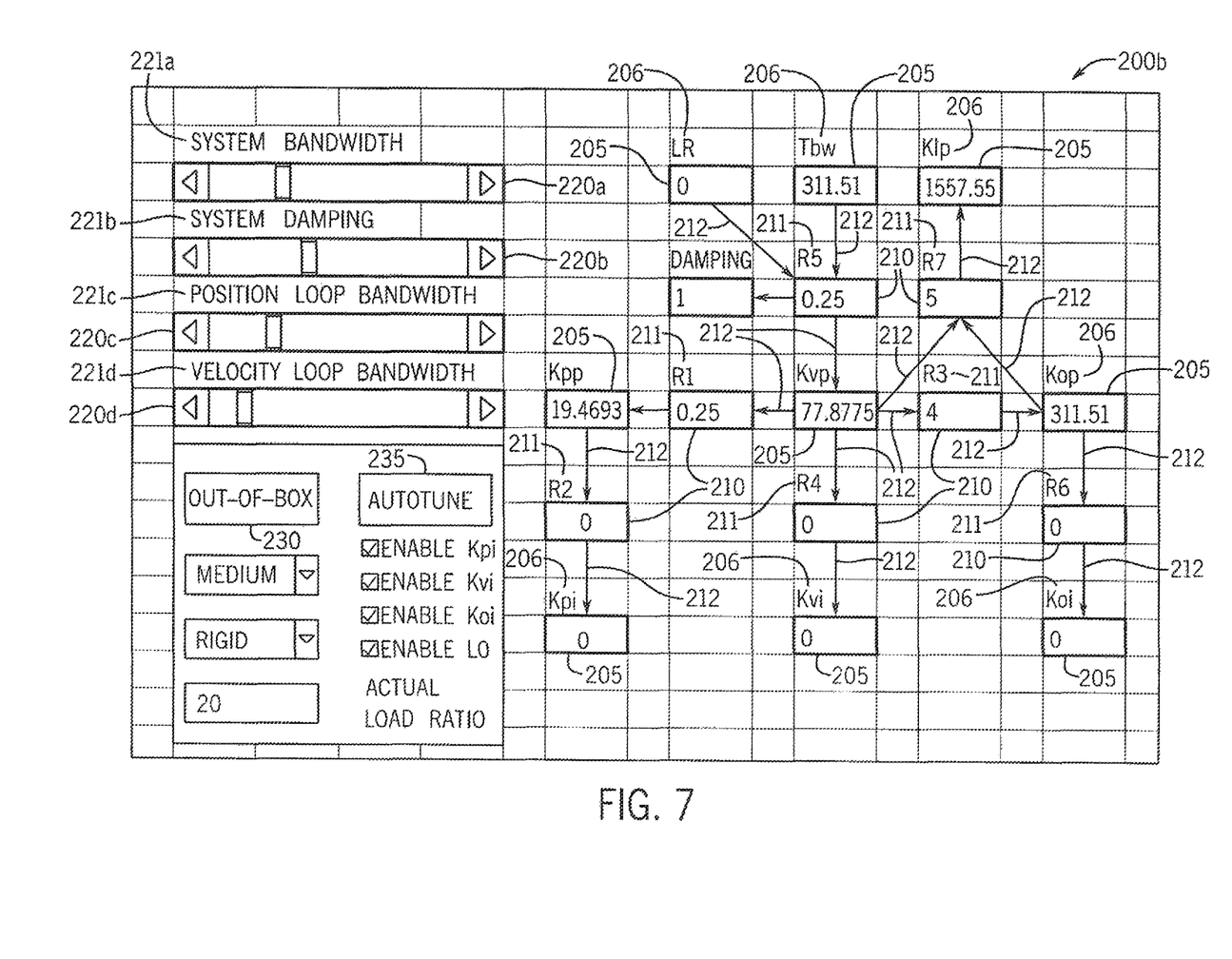
FIG. 7 is another embodiment of an interface screen displayed on a monitor of the user terminal of FIG. 5 for adjusting parameters of the motor drive of FIG. 1.

With reference next to FIGS. 6 and 7, the controller gains and/or filter settings read from the motor drive 10 may be displayed on an interface screen 200 for subsequent adjustment. The interface screen 200 may be shown on the monitor 156 of the user terminal 150. Parameter text boxes 205 display the present value of each of the controller gains or filter settings read from the parameters of the motor drive 10. Each parameter text box 205 includes a parameter label 206 identifying the controller gain or filter setting displayed in each parameter text box 205. Ratio text boxes 210 display the relationship between two of the controller gains or filter settings based on the values read from the parameters of the motor drive 10. Each ratio text box 210 includes a ratio label 211 identifying the ratio displayed in each ratio text box 210. Lines or arrows 212 identify the controller gains or filter settings on which each ratio is determined. Table 1, included below, provides an exemplary set of ratios that may be determined to define the relationships between parameters, where the controller gains are position loop, velocity loop, or observer integral and proportional gains. It is contemplated that various other ratios or inverse ratios may be utilized without deviating from the scope of the invention where each of the controller gains are included in at least one of the ratios.

TABLE 1

Calculation of ratios according to one embodiment of the invention.
Calculation

R1 = Kvp/Kpp
R2 = Kpi/Kpp
R3 = Kop/Kvp
R4 = Kvi/Kvp
R5 = Klp/max(Kop, Kvp)
R6 = Koi/Kop The interface screen 200 also includes at least one user selectable object by which the controller gains may be adjusted. In each of the illustrated embodiments 200a, 200b, multiple user selectable objects are provided. A number of sliders 220 are illustrated, where each slider 220 includes a slider label 221. According to the illustrated embodiments, four sliders 220 and their corresponding labels 221 are provided on each interface screen 200. A first slider 220a allows parameters to be adjusted based on a desired system bandwidth, as indicated by the first slider label 221a. A second slider 220b allows parameters to be adjusted based on a desired system damping, as indicated by the second slider label 221b. A third slider 220c allows parameters to be adjusted based on a desired position loop bandwidth, as indicated by the third slider label 221c. A fourth slider 220d allows parameters to be adjusted based on a desired velocity loop bandwidth, as indicated by the fourth slider label 221d. Although the illustrated embodiments include four sliders for user selectable objects, it is contemplated that various other numbers or types of user selectable objects and/or desired performance metrics may be utilized without deviating from the scope of the invention. Other user selectable objects may be, but are not limited to, a dial, up/down arrow buttons, a text box, a pull-down menu, and the like.

Each user selectable object outputs a value to the processor 160 by which the parameters may be adjusted. Commonly, a maximum value and a minimum value for the user selectable object are defined, where the maximum value is selected when, for example, the slider 220 is moved fully to the right and the minimum value is selected when, for example, the slider 220 is moved fully to the left. As the slider 220 is positioned between the two ends of travel, a value between the minimum and maximum value is output to the processor. According to one embodiment of the invention, the range of values is selected on a percentage, or per unit, basis. The minimum value is selected as zero, or zero percent, and the maximum value is selected as one, or one hundred percent. According to another embodiment of the invention, the minimum and maximum values of each slider may be determined as a function of the motor drive 10 to which the user terminal 150 is connected. The motor drive 10 may store an accepted range of values or, optionally, the range may be calculated based on various parameter settings within the motor drive 10 such as rated current, voltage, and/or power of a motor connected to the motor drive 10.

Movement of the user selectable object causes the value output to the processor 160 to change and, in turn, causes the processor 160 to determine new values for the controller gains and/or filter settings of the motor drive 10. It is contemplated that each of the user selectable objects may adjust only a portion of or the entire set of parameters. The parameters to be adjusted may be determined as a function of the selected performance metric, the selected parameter to be changed, the ratios between parameters, or a combination thereof. With reference again to FIGS. 6 and 7, if the system bandwidth slider 220a is moved, the entire set of parameters may be changed while maintaining the ratios defined between the parameters. The system bandwidth slider 220a may, for example, directly adjust the value of the proportional gain in the position loop, Kpp. Subsequent changes to controller gains may be made based on the ratios previously determined. The value of the integral gain in the position loop, Kpi, may be determined based on the second ratio, R2, and the value of the proportional gain in the velocity loop, Kvp, may be determined based on the first ration, R1. Sequential calculations utilizing other ratios may determine still other controller gains. Having determined the value of the proportional gain in the velocity loop, Kvp, for example, the integral gain in the velocity loop, Kvi, may be determined based on the fourth ratio, R4, or the proportional gain in the observer, Kop, may be determined based on the third ratio, R3. While it is contemplated that the initial controller gain and/or additional controller gains may be determined based on other formulas including, for example, a squared relationship between gains, the ratios are used to maintain a ratiometric spacing between controller gains while using the sliders 220 or other user selectable objects to adjust the gains. As a result of preserving the relationships between gains while adjusting the gains, smooth transitions occur between the initial performance of a motor 40 connected to the motor drive 10 and the performance resulting from the adjusted controller gains. In contrast, adjusting individual controller gains or setting multiple controller gains according to a different set of relationships between gains often results in sudden jumps, or steps, in performance and may result in an undesirable level of performance of the motor 40 during the tuning process.

It is further contemplated that the interface screen 200 may provide user selectable objects that do not maintain the ratios between the controller gains as previously discussed. Two such objects are illustrated as buttons 230, 235. A first button 230 (Out-of-Box) provides a method for resetting parameters to the original parameters set in the motor drive 10 as sent from the factory. A second button 235 (Autotune) initiates a tuning process according to a series of predefined rules, which may include, for example, starting and stopping the motor 40 and/or running the motor 40 at different speeds or under different loading levels. Either button 230, 235 will set the values in the controller gains and/or filter settings based on predefined rules, (i.e., original values or the auto-tuning results) without maintaining the ratios previously determined. New values for the controller gains and ratios will be determined and displayed in the parameter text boxes 205 and ratio text boxes 210, respectively. Subsequent use of the sliders 220 will maintain the newly determined values of the ratios resulting from resetting the parameters to out-of-box tuning or from auto-tuning.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for improving performance of a motor drive controlling operation of a motor operatively connected to the motor drive, the method comprising the steps of:
   reading a value of a plurality of parameters into a user terminal from a memory device in the motor drive, wherein the value in each of the plurality of parameters defines one of a controller gain and a filter setting;
   determining a plurality of ratios as a function of the value of the plurality of parameters read from the memory device, wherein each ratio is between the value stored in a first parameter, selected from the plurality of parameters, and the value stored in one of the other parameters within the plurality of parameters;
   displaying the value of at least a portion of the plurality of parameters on a monitor of the user terminal;
   displaying at least one user selectable object on the monitor, wherein each user selectable object is operative to change the values of the plurality of parameters;
   adjusting the values of each of the plurality of parameters responsive to a single input from one of the at least one user selectable objects, wherein each of the plurality of ratios remains the same when the values of the plurality of parameters are adjusted;
   writing the adjusted values of the plurality of parameters from the user terminal to the memory device on the motor drive; and
   controlling operation of the motor operatively connected to the motor drive with the adjusted values of the plurality of parameters.

2. The method of claim 1 wherein the step of determining the plurality of ratios further comprises the steps of:
   converting each value of the plurality of parameters to a common unit; and
   determining a direct relationship between the value stored in the first parameter and the value stored in each of the other parameters.

3. The method of claim 1 wherein the step of determining the plurality of ratios further comprises determining at least one ratio having a squared relationship between the value stored in the first parameter and the value stored in one of the other parameters.

4. The method of claim 1 wherein the user selectable object used to change the values of the plurality of parameters defines one of the values for the plurality of parameters.

5. The method of claim 1 wherein the user selectable object used to change the values of the plurality of parameters defines a metric for desired performance of the motor drive.

6. The method of claim 5 wherein the metric is selected from one of a desired system bandwidth, a desired system damping, and a desired control loop bandwidth.

7. The method of claim 1 wherein the user selectable object is selected from one of a slider bar, a dial, a text box, and a menu.

8. A method for improving performance of a motor drive controlling operation of a motor operatively connected to the motor drive, the method comprising the steps of:
   displaying a value of a plurality of parameters on a user interface, wherein the values of each of the plurality of parameters defines one of a controller gain and a filter setting for the motor drive;
determining a plurality of ratios as a function of the value of the plurality of parameters displayed on the user interface;
receiving a single input from at least one user selectable object corresponding to an adjustment to the values of the plurality of parameters;
adjusting the values of each of the plurality of parameters responsive to the single input, wherein each of the plurality of ratios remains the same when the values of the plurality of parameters are adjusted;
displaying the adjusted values of the plurality of parameters on the user interface; and
storing the adjusted values of the plurality of parameters in a memory device in the motor drive; and
controlling operation of the motor operatively connected to the motor drive with the adjusted values of the plurality of parameters.

9. The method of claim 8 wherein each of the plurality of ratios is defined by:
converting each value of the plurality of parameters to a common unit;
determining a ratio between the value stored in a first parameter, selected from the plurality of parameters, and the value stored in one of the other parameters within the plurality of parameters; and
determining a direct relationship between the value stored in the first parameter and the value stored in each of the other parameters.

10. The method of claim 8 wherein each of the plurality of ratios is defined by:
determining a ratio between the value stored in a first parameter, selected from the plurality of parameters, and the value stored in one of the other parameters within the plurality of parameters; and
determining at least one ratio having a squared relationship between the value stored in the first parameter and the value stored in one of the other parameters.

11. The method of claim 8 wherein the user selectable object used to change the values of the plurality of parameters defines one of the values for the plurality of parameters.

12. The method of claim 8 wherein the user selectable object used to change the values of the plurality of parameters defines a metric for desired performance of the motor drive.

13. The method of claim 12 wherein the metric is selected from one of a desired system bandwidth, a desired system damping, and a desired control loop bandwidth.

14. The method of claim 8 wherein the user selectable object is selected from one of a slider bar, a dial a text box, and a menu.

15. A system for determining configuration of a controller in a motor drive, wherein the controller includes a plurality of controller gains, the system comprising:
a monitor to display at least one user selectable object;
a user interface operative to change the at least one user selectable object;
a non-transitory storage medium configured to store a plurality of instructions; and
a processor in communication with the non-transitory storage medium and operative to execute the plurality of instructions to:
read a value from each of the plurality of controller gains in the motor drive,
determine a plurality of ratios as a function of the value for each of the plurality of controller gains read from the motor drive, wherein each ratio is between the value stored in a first controller gain, selected from the plurality of controller gains, and the value stored in one of the other controller gains within the plurality of controller gains,
display the at least one user selectable object on the monitor, wherein each user selectable object is operative to change the values of the plurality of controller gains,
receive an input from the user interface corresponding to a desired change in the values of the plurality of controller gains,
adjust the values of each of the plurality of controller gains responsive to the input from the user interface, wherein each of the plurality of ratios remains the same when the values of the plurality of controller gains are adjusted, and
write the adjusted values of the plurality of controller gains to the motor drive, wherein the motor drive is operative to control operation of a motor as a function of the adjusted values of the plurality of controller gains.

16. The system of claim 15 wherein determining the plurality of ratios further comprises the processor executing the plurality of instructions to:
convert each value of the plurality of controller gains to a common unit; and
determine a direct relationship between the value stored in the first controller gain and the value stored in each of the other controller gains.

17. The system of claim 15 wherein the step of determining the plurality of ratios further comprises the processor executing the plurality of instructions to determine at least one ratio having a squared relationship between the value stored in the first controller gain and the value stored in one of the other controller gains.

18. The system of claim 15 wherein the user selectable object used to change the values of the plurality of controller gains defines one of the values for the plurality of controller gains.

19. The system of claim 15 wherein the user selectable object used to change the values of the plurality of controller gains defines a metric for desired performance of the motor drive.

20. The system of claim 19 wherein the metric is selected from one of a desired system bandwidth, a desired system damping, and a desired control loop bandwidth.

* * * * *